US009733419B2

(12) United States Patent
Tsai et al.

(10) Patent No.: US 9,733,419 B2
(45) Date of Patent: Aug. 15, 2017

(54) ELECTRONIC DISPLAY DEVICE

(71) Applicant: InnoLux Corporation, Miao-Li County (TW)

(72) Inventors: Yung-Yu Tsai, Miao-Li County (TW); Chin-Tu Tsai, Miao-Li County (TW); Wen-Hung Lee, Miao-Li County (TW); Ting-Yen Lin, Miao-Li County (TW); Tzu-Yuan Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 39 days.

(21) Appl. No.: 14/845,040

(22) Filed: Sep. 3, 2015

(65) Prior Publication Data

US 2016/0081203 A1  Mar. 17, 2016

(30) Foreign Application Priority Data

Sep. 15, 2014 (TW) .............................. 103216319 U (51) Int. Cl.
| | |
|---|---|
| *G09F 13/04* | (2006.01) |
| *G09F 13/08* | (2006.01) |
| *F21V 8/00* | (2006.01) |
| *G02F 1/1333* | (2006.01) |

(52) U.S. Cl.
CPC ..... *G02B 6/0085* (2013.01); *G02F 1/133308* (2013.01); *G02F 2001/13332* (2013.01); *G02F 2001/133314* (2013.01)

(58) Field of Classification Search
CPC ............. G02B 6/0085; G02F 1/133308; G02F 2001/133314; G02F 2001/13332
USPC .......................... 362/97.1, 97.2, 97.3; 349/58
See application file for complete search history.

(56) References Cited

U.S. PATENT DOCUMENTS

| | | | |
|---|---|---|---|
| 2009/0122223 A1* | 5/2009 | Hayano ............. | G02F 1/136209 349/58 |
| 2014/0111735 A1* | 4/2014 | Cho ................... | G02F 1/133608 349/58 |
| 2015/0062480 A1* | 3/2015 | Cho ................... | G02F 1/133308 349/58 |

(Continued)

FOREIGN PATENT DOCUMENTS

KR    1020150116016    * 10/2015

OTHER PUBLICATIONS

Machine English Translation of KR1020150116016 Oct. 2015, Korea; Kim.*

*Primary Examiner* — Anh Mai
*Assistant Examiner* — Glenn Zimmerman
(74) *Attorney, Agent, or Firm* — McClure, Qualey & Rodack, LLP (57) ABSTRACT

An electronic display device is provided. The electronic display device includes an electronic display panel and a rear chassis assembly. The rear chassis assembly includes a bottom wall, a first and a second side wall, and a first and a second sheet. The first and the second side walls are respectively disposed at two opposite edges of the bottom wall. The electronic display panel is positioned in an accommodation space defined by the first side wall, the second side wall, and the bottom wall. The first and second sheets are respectively fixed on the first and second side walls. The curvature of the first sheet corresponds to the curvature of the first side wall, and the curvature of the second sheet corresponds to the curvature of the second side wall.

9 Claims, 9 Drawing Sheets

(56) References Cited

U.S. PATENT DOCUMENTS

2015/0168768 A1* 6/2015 Nagatani ............... G06F 1/1601
349/58
2015/0286088 A1* 10/2015 Kim .................. G02F 1/133308
349/58

* cited by examiner

ELECTRONIC DISPLAY DEVICE

CROSS REFERENCE TO RELATED APPLICATIONS

This Application claims priority of Taiwan Patent Application No. 103216319, filed on Sep. 15, 2014, the entirety of which is incorporated by reference herein.

BACKGROUND

Field of the Invention

The disclosure relates to an electronic display device and element thereof, and in particular it relates to a curved electronic display device and a rear chassis assembly thereof.

Description of the Related Art

An electronic display device is an optoelectronic device able to transfer electric signals into visible images so that human beings can see the information contained in the electronic signals. LCDs (Liquid-Crystal displays), PDP (plasma display panel) displays, EL (electro luminescence) displays, FEDs (field emission displays), and DMD (deformable mirror device) displays have gained great popularity. Because of their slimness, low power consumption and low radiation, these image-display devices have been widely used in portable electronic devices such as desktop computers, notebook computers, personal digital assistants (PDAs), and mobile phones, and are even gradually replacing cathode ray tube (CRT) monitors and conventional TVs.

Recently, market trends have led to the size of the electronic display device increasing over time. As the size of the flat panel liquid-crystal display is increased, a difference in views is experienced between different viewing angles. Normally, for a flat electronic display device, the position head on with the central line of the electronic display device is the best view position. The viewers at other positions may feel different viewing experience compared with the viewer in the position that is head-on with the center. For example, a trapezoidal distortion problem may occur as the viewer watches the electronic display device with a relatively large viewing angle.

One solution is to use an electronic display device with a curved display surface. The curved electronic display device not only provides multiple viewing angles for watching but eliminates the trapezoidal distortion problem. Although the curved electronic display device has already existed in the market for some time, in order to maintain the desired curvature a bulky and large enforcing bracket is usually used for enhancing the structural strength. However this does not fulfill the requirements of being slim and having an attractive appearance of today's electronic display devices.

SUMMARY

In light of the foregoing problem, one objective of the disclosure is to provide an electronic display device with a curved display surface. The electronic display device utilizes a sheet with relatively small size to maintain the desired curvature of the electronic display device. As a result, the thickness of the electronic display device is decreased, and the electronic display device has a beautiful exterior look. In addition, since the desired curvature of the electronic display device is maintained, the other elements (such as wiring lines and exterior housing member) of the electronic display device can be assembled efficiently, and the product yield is also improved.

According to one embodiment, the electronic display device includes an electronic display panel and a rear chassis assembly. The electronic display panel has a display surface. The rear chassis assembly includes a substrate, a first side wall, a second side wall, a first sheet, and a second sheet. The substrate has a curvature. The first side wall and the second side wall are respectively disposed on two opposite sides of the substrate. A space is defined by the first and second side walls and the substrate for the position of the electronic display panel. The first sheet is fixed on the first side wall, and the curvature of the first sheet substantially corresponds to the curvature of the first side wall. The second sheet is fixed on the second side wall, and the curvature of the second sheet substantially corresponds to the curvature of the second side wall.

In some embodiments, each of the first side wall and second side wall has a setting surface. Each of the setting surfaces is substantially perpendicular to the display surface. The first sheet is disposed on the setting surface of the first side wall, and the second sheet is disposed on the setting surface of the second side wall.

In the above-mentioned embodiments, the substrate has a through hole, and the rear chassis assembly further includes a bracket and a third sheet. The bracket includes a main portion arranged on a front surface of the substrate which faces the electronic display panel and includes an extending portion protruding from the main portion in a direction away from the electronic display panel and passing through the through hole. The third sheet is connected to the extending portion, and the curvature of the third sheet substantially corresponds to the curvature of the substrate. In some embodiments, the substrate includes a flange arranged adjacent to the through hole, and the flange is clamped between the extending portion and the third sheet.

In the above-mentioned embodiments, the electronic display device further includes a light source member, wherein the main portion of the bracket extends from the second side wall to the first side wall, and the light source member is arranged adjacent to the second side wall and disposed on the bracket for dissipating heat from the light source member via the bracket. Alternatively, the electronic display device further includes two heat dissipation plates respectively connected to two sides of the bracket and includes two light source members respectively disposed on the two dissipation plates for dissipating heat from the two light source members via the two heat dissipation plates and the bracket.

In some other embodiments, the substrate includes a back surface which is away from the electronic display panel and includes a supporting surface connected to the back surface, wherein the supporting surface protrudes from the back surface in a direction away from the electronic display panel, and the third sheet is disposed on the supporting surface.

In any of the above-mentioned embodiments, each of the first sheet, the second sheet, and the third sheet has a flat configuration.

In any of the above-mentioned embodiments, the display surface is a curved surface.

In any of the above-mentioned embodiments, the ratio of the thickness of each of the first sheet and the second sheet and the thickness of one of the corresponding first and second side walls is in a range from 1 to 3.

BRIEF DESCRIPTION OF THE DRAWINGS

The present invention can be more fully understood by reading the subsequent detailed description and examples with references made to the accompanying drawings, wherein.

DETAILED DESCRIPTION

Several exemplary embodiments of the application are described with reference to FIGS. 1 through 10. It is to be understood that the following disclosure provides various different embodiments as examples for implementing different features of the application. This description is made for the purpose of illustrating the general principles of the invention and should not be taken in a limiting sense.

Figure 1:
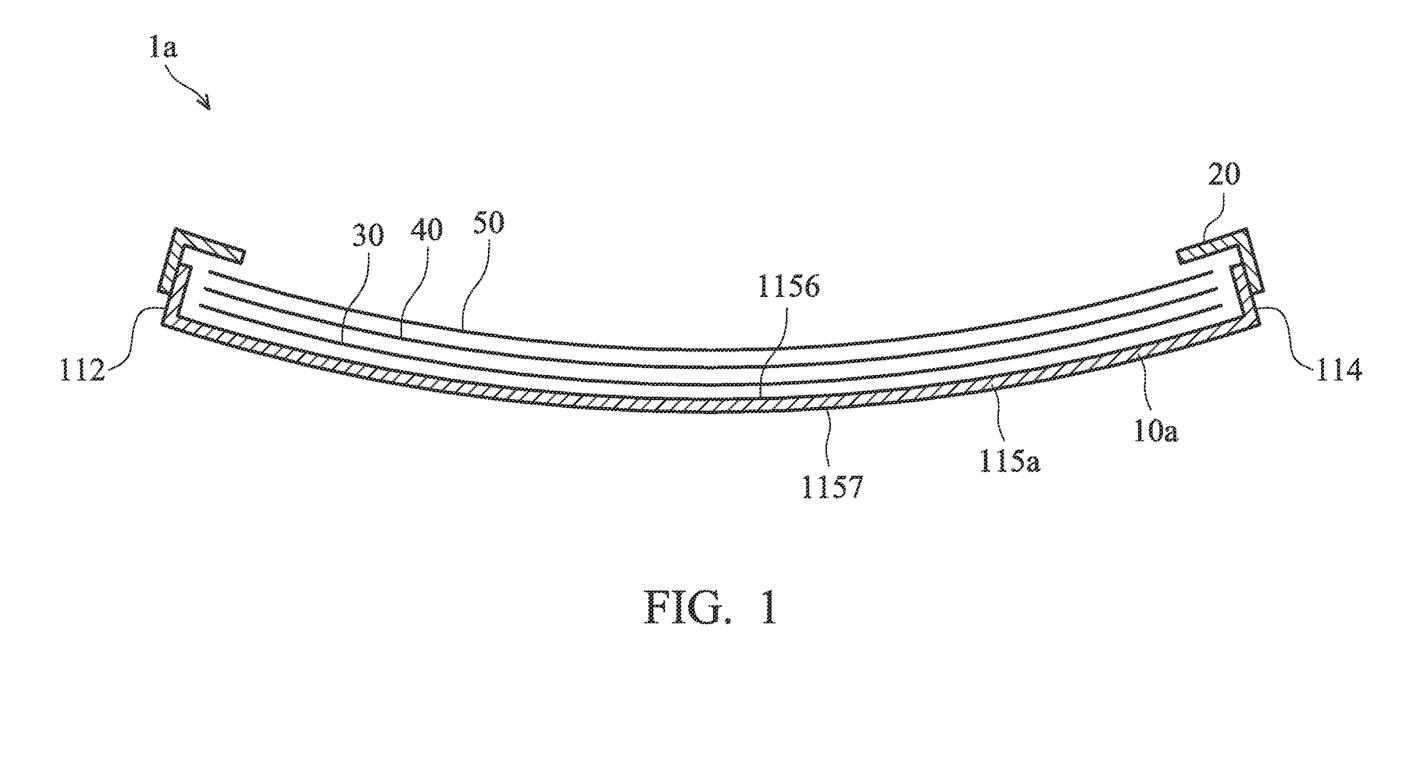
FIG. 1 shows a cross-sectional view of an electronic display device, in accordance with some embodiments.

FIG. 1 shows a transverse cross-sectional view of an electronic display device 1a, in accordance with some embodiments. In some embodiments, the electronic display device 1a is a liquid-crystal display device which includes a rear chassis assembly 10a, a front bezel 20, a backlight module 30, an optical film unit 40, and an electronic display panel 50. The backlight module 30, the optical film unit 40, and the electronic display panel 50 are positioned in a space defined by the rear chassis assembly 10a and the front bezel 20. The electronic display panel 50 is a liquid-crystal display panel. The backlight module 30 provides backlight to the electronic display panel 50 via the optical film unit 40. However, it should be appreciated that while the electronic display device 1a is a liquid-crystal display device, the disclosure is not limited thereto. In some other embodiments, the electronic display device 1a is an OLED (Organic Light-Emitting Diode) display device or a display device of another type.

Figure 2:
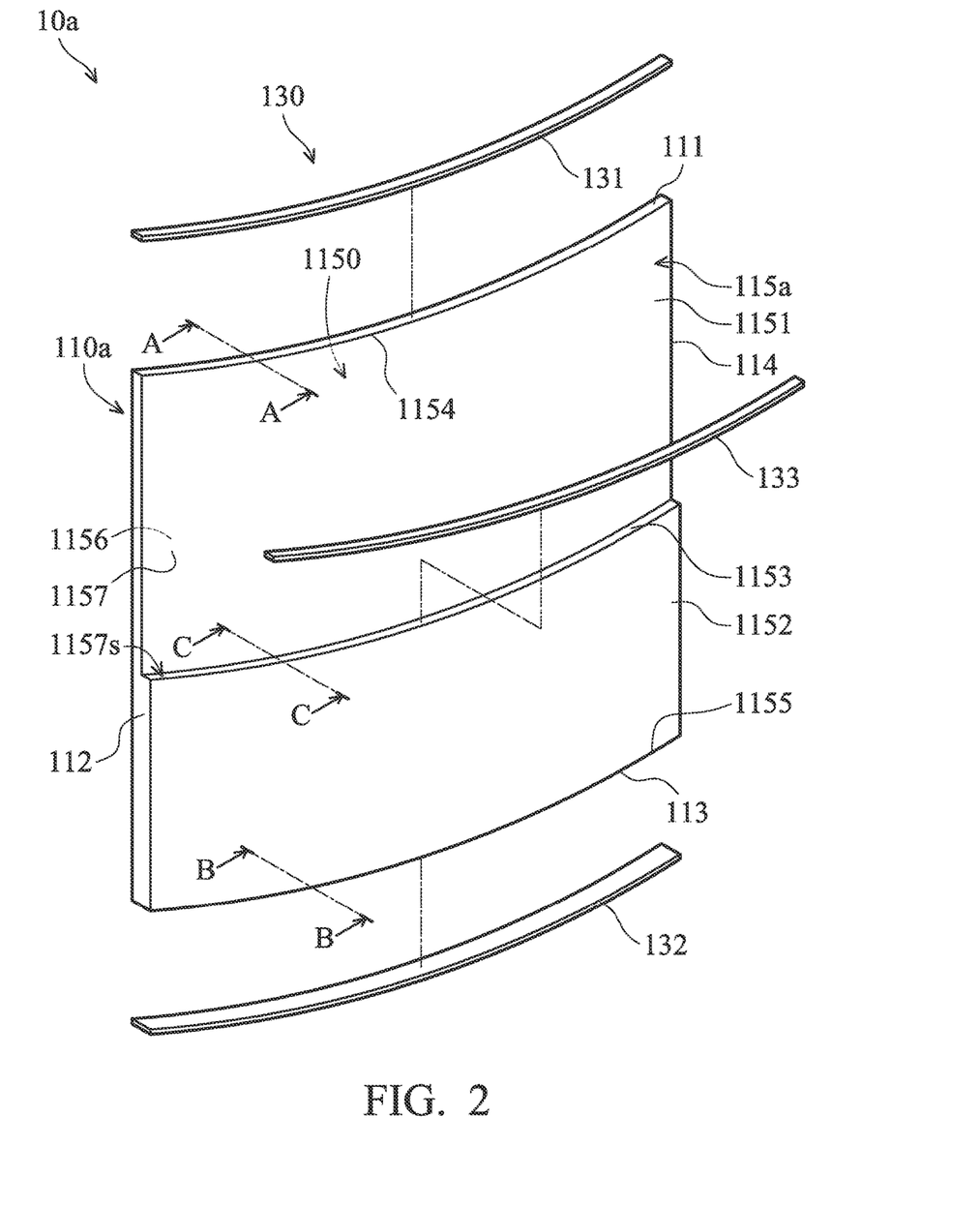
FIG. 2 shows an exploded view of a rear chassis assembly, in accordance with some embodiments.

FIG. 2 shows an exploded view of the rear chassis assembly 10a, in accordance with some embodiments. In some embodiments, the rear chassis assembly 10a includes a chassis body 110a and an auxiliary unit 130.

The chassis body 110a includes a substrate 115a and a number of side walls, such as first side wall 111, second side wall 113, third side wall 112, and fourth side wall 114. The substrate 115a has a configuration with a thin, curved plate which has a curvature on the horizontal plane. In some embodiments, the substrate 115a includes a first portion 1151, a second portion 1152, and a connecting portion 1153. The first and second portions 1151 and 1152 extend along a vertical direction. The connecting portion 1153 extends along a horizontal direction. The first and second portions 1151 and 1152 are connected to one another via the connecting portion 1153. The first side wall 111, the second side wall 113, the third side wall 112, and the fourth side wall 114 protrude from the upper edge 1154, lower edge 1155, left edge, and right edge along a direction away from the electronic display panel 50 (FIG. 1), so as to define a space 1150 for receiving the electronic display panel 50. In some embodiments, the first and second side walls horizontally extend toward the electronic display panel 50, however the disclosure should not be limited thereto.

The auxiliary unit 130 includes a number of sheets for maintaining the structure of the chassis body 110a. In some embodiments, the auxiliary unit 130 includes a first sheet 131, a second sheet 132, and third sheet 133. Each of the first sheet 131, the second sheet 132, and the third sheet 133 has a flat configuration and extends in a horizontal direction. In addition, each of the first sheet 131, the second sheet 132, and the third sheet 133 has a curvature which is the same as the curvature of the substrate 115a. In some other embodiments, the auxiliary unit 130 merely includes the first sheet 131 and the second sheet 132.

Figure 3:
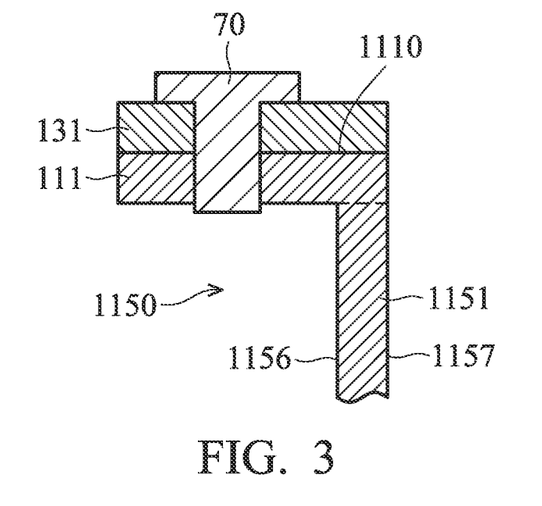
FIG. 3 shows a cross-sectional view taken along line A-A of FIG. 2.
Figure 4:
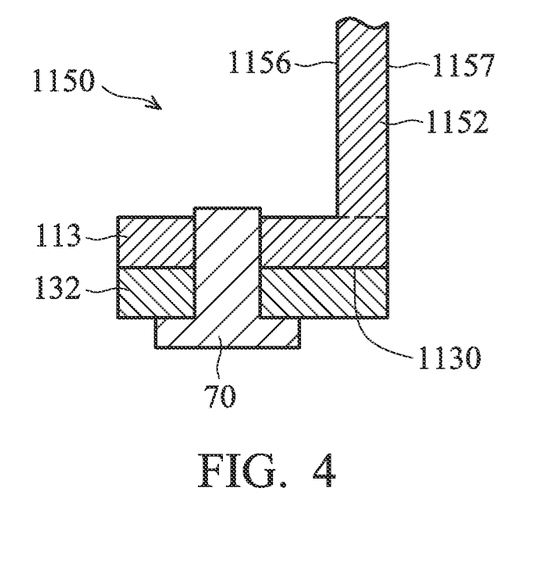
FIG. 4 shows a cross-sectional view taken along line B-B of FIG. 2.
Figure 5:
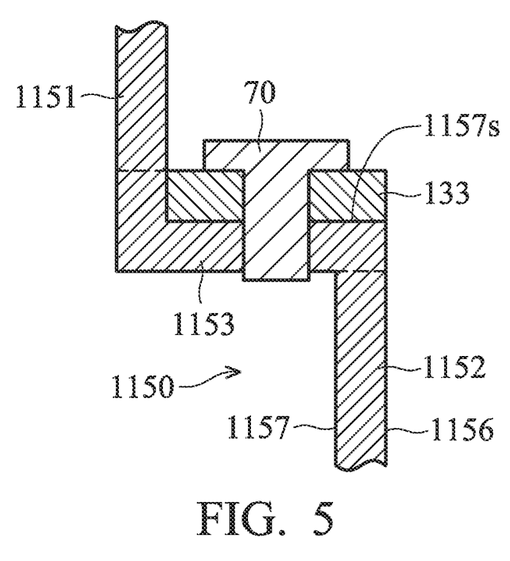
FIG. 5 shows a cross-sectional view taken along line C-C of FIG. 2.

FIGS. 3-5 are schematic views showing how the first sheet 131, the second sheet 132, and the third sheet 133 are connected to the substrate 115a. As shown in FIG. 3, the first sheet 131 is positioned on a setting surface 1110 of the first side wall 111 via one or more fixing elements 70 (such as screws or bolts). Moreover, as shown in FIG. 4, the second sheet 132 is positioned on an setting surface 1130 of the second side wall 113 via one or more fixing elements 70 (such as screws or bolts). The first sheet 131 and the second sheet 132 are configured to support or reinforce the curved structure of the substrate 115a, but the disclosure should not be limited thereto. In addition, as shown in FIG. 5, the third sheet 133 is positioned on a back surface 1157 of the substrate 115a via one or more fixing element 70 (such as screws or bolts). The third sheet 133 is arranged between the upper edge 1154 and the lower edge 1155. Specifically, as shown in FIG. 2, a supporting surface 1157s is defined as a region of the back surface 1157 of the substrate 115a which corresponds to the connection portion 1153. The supporting surface 1157s is arranged parallel to the horizontal plane, and the third sheet 133 is positioned on the supporting surface 1157s. In some embodiments, the extension direction the supporting surface 1157s is parallel to the extension direction of the first side wall 111 or the second side wall 113.

In some embodiments, the thickness of the first sheet 131 is greater than the thickness of the first side wall 111, and the thickness of the second sheet 132 is greater than the thickness of the second side wall 113. For example, the ratio of the thickness of each of the first sheet and the second sheet and the thickness of one of the corresponding first and second side walls is in a range from 1 to 3 so that the curvature of the chassis body 110a is maintained.

In some embodiments, the first sheet 131, the second sheet 132, and the third sheet 133 are made of the same or different materials as those of the chassis body 110a. Each of the first sheet 131, the second sheet 132, and the third sheet 133 has less deformation than the chassis body 110a as an external thrust is applied. For example, the first sheet 131, the second sheet 132, and the third sheet 133 are made of material selected from iron or stainless steel. The chassis body 110a is made of aluminium or alloy.

In the above-mentioned embodiments, with the arrangement of the auxiliary unit 130, a change in the curvature of the substrate 115a of the chassis body 110a can be prevented. Moreover, since the chassis body 110a has a fixed curvature, the assembly efficiency and the production yield are improved accordingly. In addition, since the auxiliary unit 130 has a flat configuration, the thickness of the electronic display device 1a is not increased due to the use of the auxiliary unit 130. As a result, the entire thickness of chassis body 110a is less than the thickness of a rear chassis assembly in which a "⊏"-shaped reinforcing bracket is used, and the chassis body 110a has a beautiful look.

It should be noted that while the auxiliary unit 130 includes three sheets, the disclosure should not be limited thereto. The number of sheets and the positions of the sheets can be varied according to demand.

Figure 6:
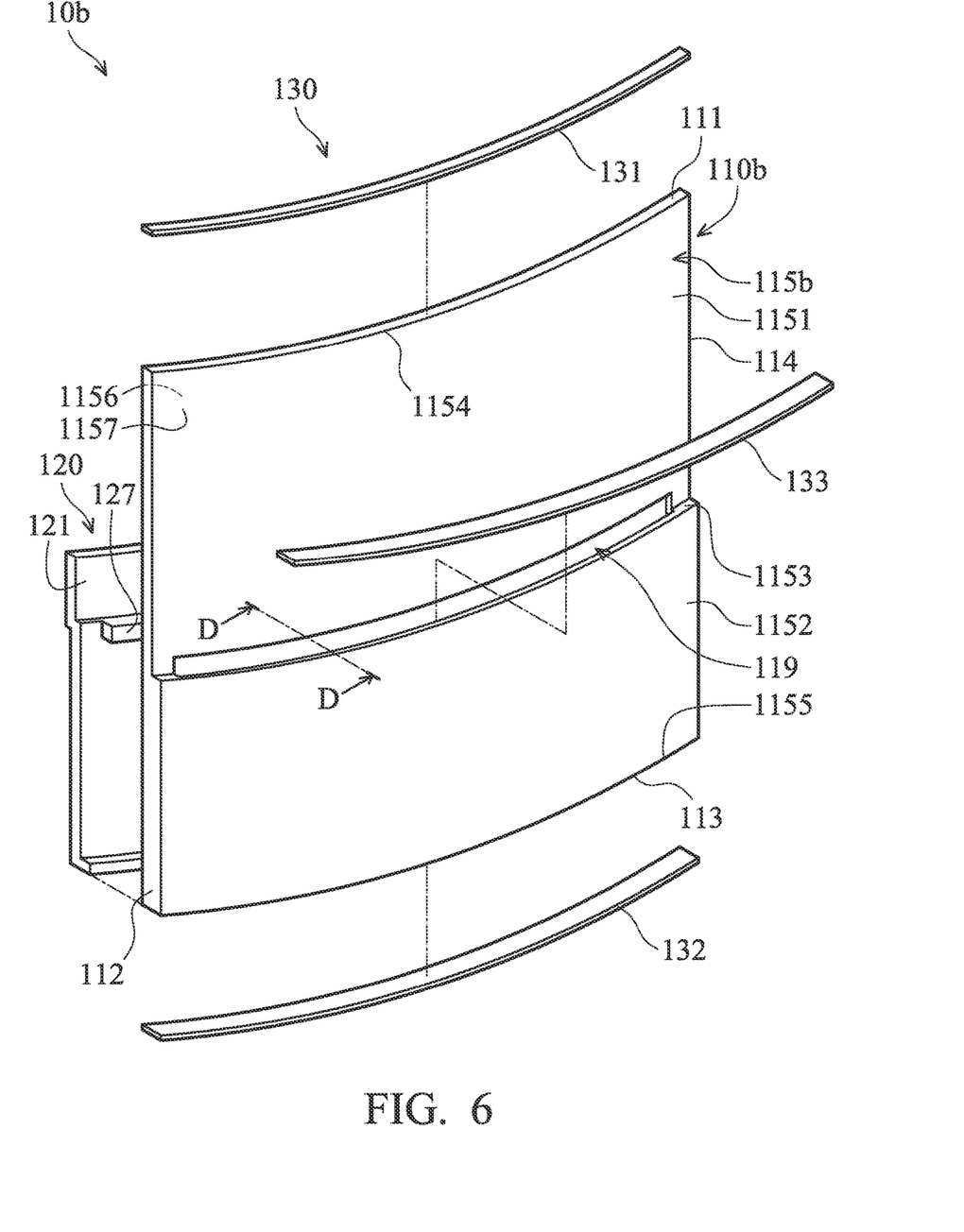
FIG. 6 shows an exploded view of a rear chassis assembly, in accordance with some other embodiments.

FIG. 6 shows an exploded view of a rear chassis assembly 10b, in accordance with some other embodiments. In the embodiments of FIG. 6, elements similar to those of the embodiments of FIG. 2 are provided with the same reference numbers, and the features thereof are not repeated in the interest of brevity. Differences between the rear chassis assembly 10b and the rear chassis assembly 10a include the substrate 115a being replaced by a substrate 115b of the rear chassis assembly 10b, wherein a through hole 119 is formed at a position adjacent to the junction of the first portion 1151 and the connecting portion 1153.

Figure 7:
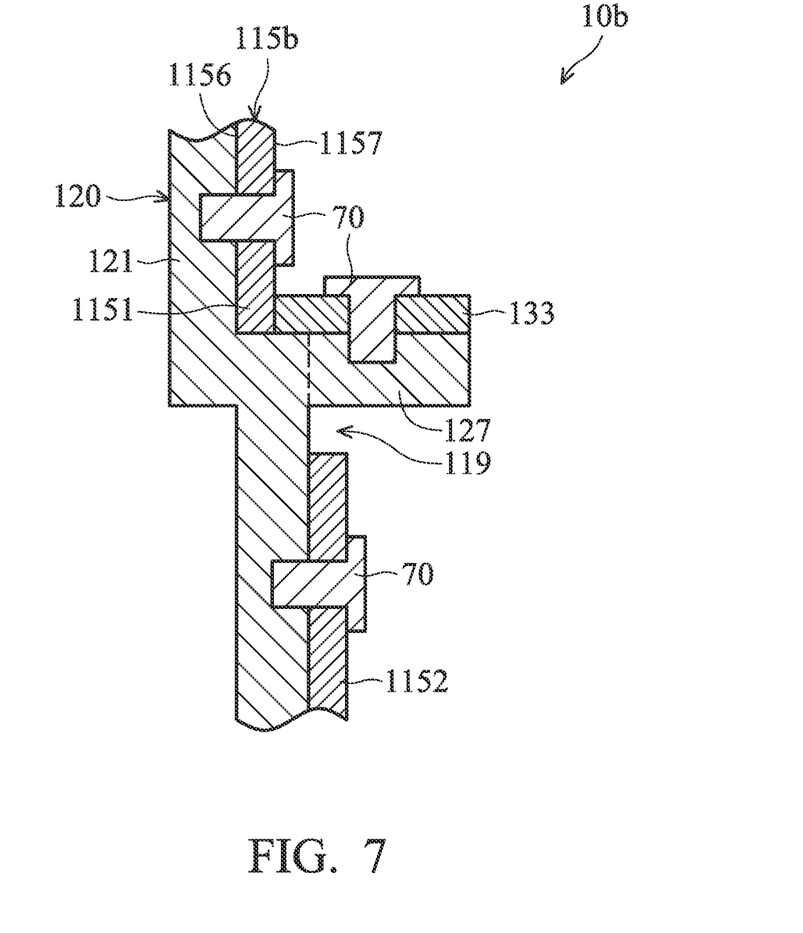
FIG. 7 shows a cross-sectional view taken along line D-D of FIG. 6.

Differences between the rear chassis assembly 10a and the rear chassis assembly 10 further includes the rear chassis assembly 10b having a bracket 120. The bracket 120 has a curvature that is the same as that of the substrate 115b and includes a main portion 121 and an extending portion 127. The main portion 121 extends from the lower edge 1155 of the substrate 115b and toward the upper edge 1154. In addition, the main portion 121 is fixed on the front surface 1156, and the main portion 121 has a shape that is compatible with the shape of the front surface 1156 of substrate 115b. The extending portion 127 is protruding backwardly from the main portion 121 in a direction away from the electronic display panel 50 and passing through the through hole 119. The third sheet 133 is positioned on a portion of the extending portion 127 that is exposed by the through hole 119 via one or more fixing elements 70 (such as screws or bolts). The bracket 120 is made of the same or different materials as those of the chassis body 110b. In some embodiments, the material of the bracket 120 is a metal with high heat conductivity (such as aluminium).

In the above-mentioned embodiment, with the arrangements of the bracket 120 and the auxiliary unit 130, a change in the curvature of the substrate 115b of the chassis body 110b can be prevented. In addition, the bracket 120 also serves a function of dissipating the heat. The details will be discussed in the descriptions relating to FIG. 9.

Figure 8:
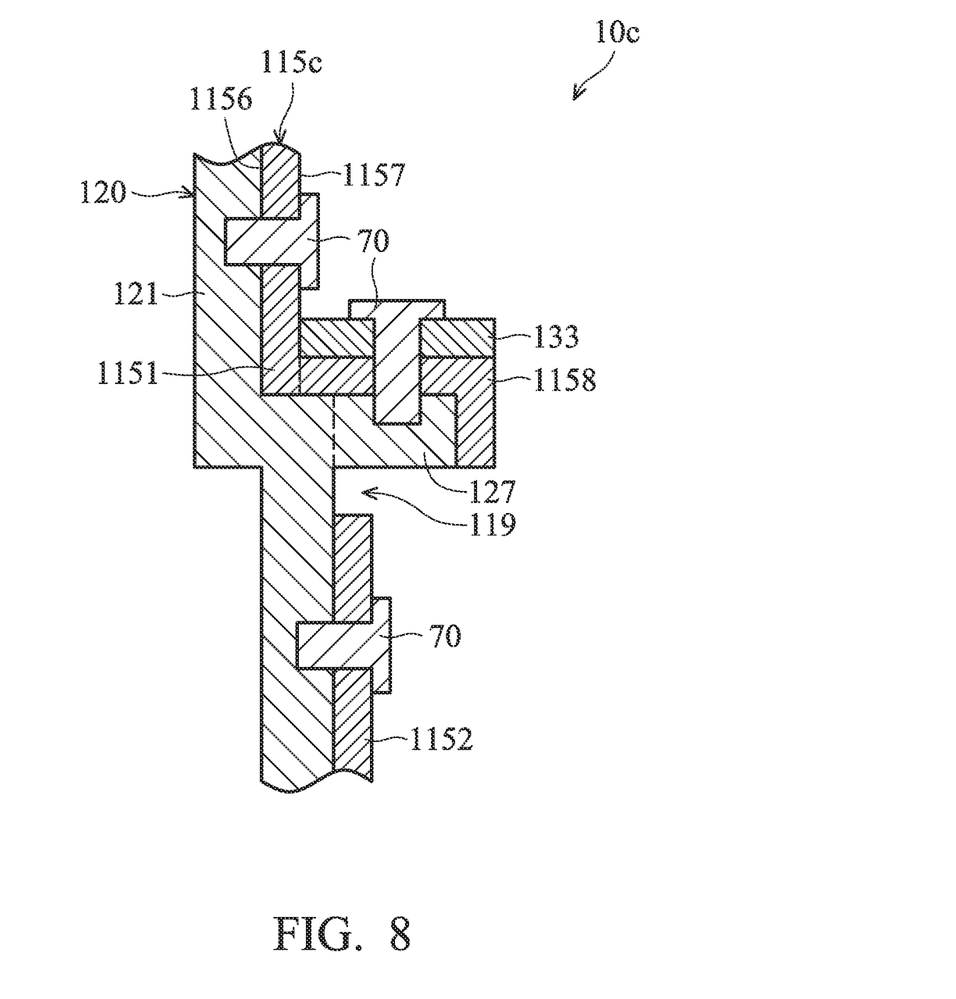
FIG. 8 shows a cross-sectional view of a portion of a rear chassis assembly, in accordance with some other embodiments.

FIG. 8 shows a cross-sectional view of a portion of a rear chassis assembly 10c, in accordance with some other embodiments. In the embodiments of FIG. 8, elements similar to those of the embodiments of FIG. 7 are provided with the same reference numbers, and the features thereof are not repeated in the interest of brevity. Differences between the rear chassis assembly 10c and the rear chassis assembly 10b include the substrate 115b of the rear chassis assembly 10b being replaced by a substrate 115c of the rear chassis assembly 10c, wherein the substrate 115c further includes a flange 1158 arranged adjacent to the through hole 119 and extends along a particular direction. In some embodiments, the extension direction of the flange 1158 is parallel to the horizontal plane. In some embodiments, the extension direction of the flange 1158 is parallel to the extension direction of the first side wall 111 or the second side wall 113. As shown in FIG. 8, the third sheet 133 is positioned on the flange 1158 via one or more fixing element 70 (such as screws or bolts), wherein the flange 1158 is clamped between the extending portion 127 and the third sheet 133.

In the above-mentioned embodiment, with the arrangements of the bracket 120 and the auxiliary unit 130, a change in the curvature of the substrate 115c of the chassis body 110c can be prevented. In addition, since the third sheet 133 is fixed on the bracket 120 and the flange 1158 of the substrate 115c, the curvature of the bracket 120 and the curvature of the flange 1158 can be regulated by the third sheet 133 so as to facilitate maintaining the curvature of the overall rear chassis assembly 10c.

Figure 9:
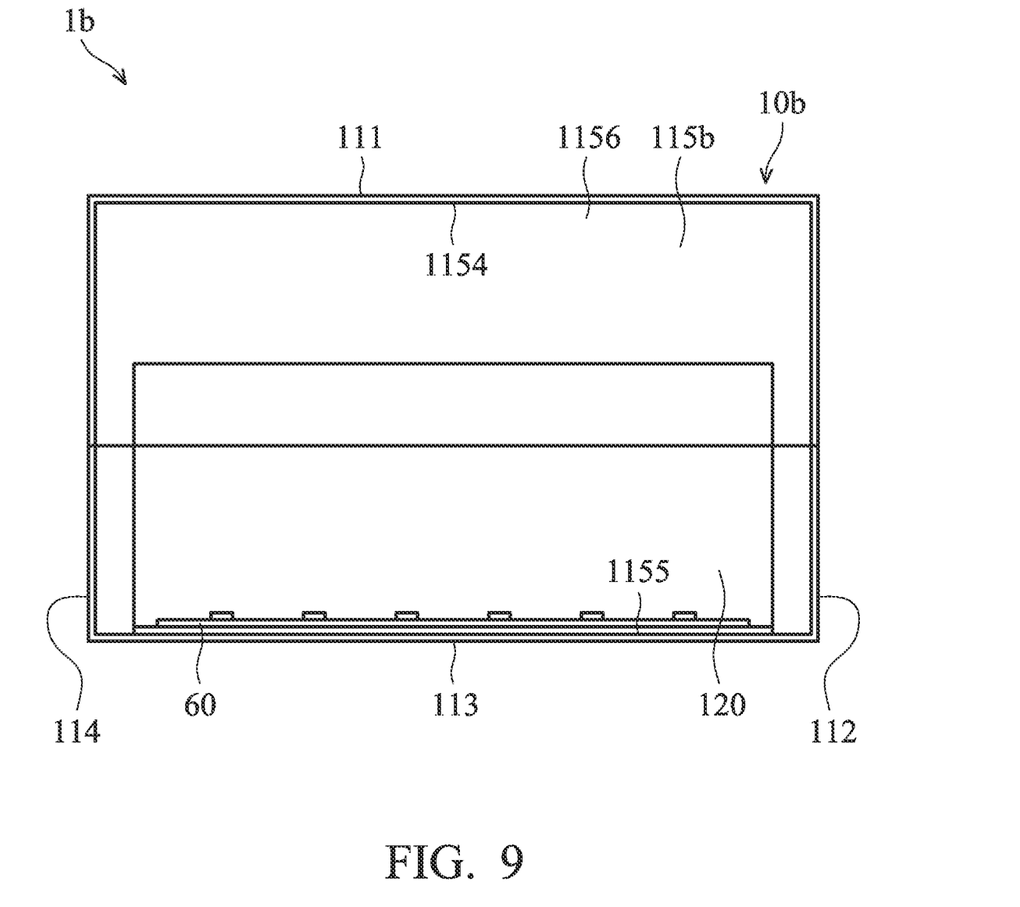
FIG. 9 shows a schematic view of partial elements of an electronic display device, in accordance with some embodiments.

The rear chassis assembly of the disclosure can be applied to a number of different electronic display devices. For example, as shown in FIG. 9, a schematic view of partial elements of an electronic display device 1b, in accordance with some embodiments, is shown. The electronic display device 1b is a single side light entry liquid-crystal display device and includes the rear chassis assembly 10b and a light source member. The light source member 60 is arranged adjacent to the second side wall 113 and disposed on the bracket 120. Since the bracket 120 has relatively high heat dissipation characteristics, the bracket 120 is used for dissipating heat from the light source member 60.

Figure 10:
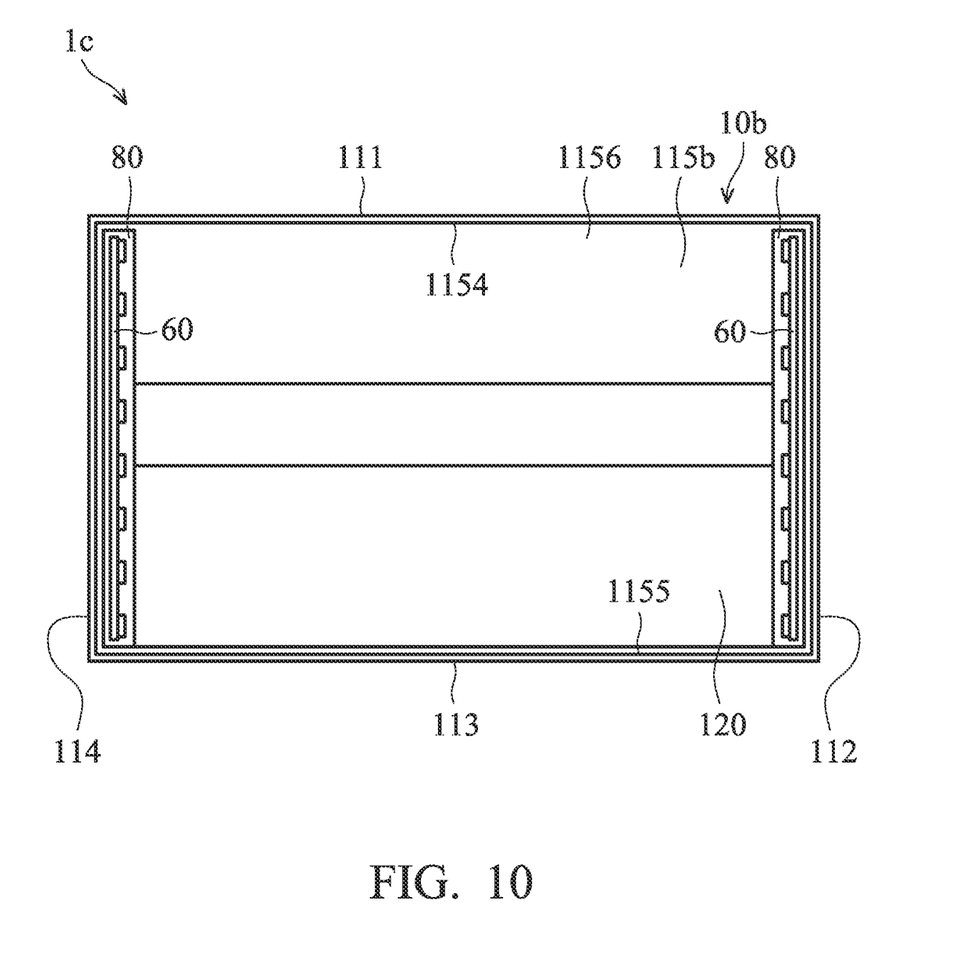
FIG. 10 shows a cross-sectional view of partial elements of an electronic display device, in accordance with some embodiments.

Alternatively, as shown in FIG. 10, a schematic view of partial elements of an electronic display device 1c, in accordance with some embodiments, is shown. The electronic display device 1c is a double side light entry liquid-crystal display device and includes the rear chassis assembly 10b, two light source members 60, and two heat dissipation plates 80. The two heat dissipation plates 80 are fixed on the front surface 1156 of the substrate 115b, wherein the two heat dissipation plates 80 are respectively adjacent to the third side wall 112 and fourth side wall 114 and connected to the two sides of the bracket 120. The two light source members 60 are respectively disposed on the two heat dissipation plates 80. Since the bracket 120 and the heat dissipation plates 80 have relatively high heat dissipation characteristics, the bracket 120 and the heat dissipation plates 80 are used for dissipating the heat from the light source member 60.

While the invention has been described by way of example and in terms of the described embodiments, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic display device, comprising:
   an electronic display panel having a display surface; and
   a rear chassis assembly comprising:
   a substrate with a curvature;
   a first side wall and a second side wall respectively disposed on two opposite sides of the substrate, wherein an space is defined by the first side wall, the second side wall and the substrate for the position of the electronic display panel;
   a first sheet fixed on the first side wall, wherein the curvature of the first sheet substantially equals the curvature of the first side wall; and
   a second sheet fixed on the second side wall, wherein the curvature of the second sheet substantially equals the curvature of the second side wall, wherein the ratio of the thickness of each of the first sheet and the second sheet and the thickness of one of the corresponding first and second side walls is in a range from 1 to 3.

2. The electronic display device as claimed in claim 1, wherein each of the first side wall and the second side wall has an setting surface substantially perpendicular to the display surface, wherein the first sheet is disposed on the setting surface of the first side wall, and the second sheet is disposed on the setting surface of the second side wall.

3. The electronic display device as claimed in claim 2, wherein the substrate has a through hole, and the rear chassis assembly further comprises a bracket and a third sheet, wherein the bracket includes:
 a main portion arranged on a front surface of the substrate which faces the electronic display panel; and
 an extending portion protruding from the main portion in a direction away from the electronic display panel and passing through the through hole,
 wherein the third sheet is connected to the extending portion, and the curvature of the third sheet substantially equals the curvature of the substrate.

4. The electronic display device as claimed in claim 2, wherein the substrate comprises a back surface which is away from the electronic display panel and a supporting surface connected to the back surface, wherein the supporting surface protrudes from the back surface in a direction away from the electronic display panel, and a third sheet is disposed on the supporting surface.

5. The electronic display device as claimed in claim 2, wherein the display surface is a curved surface.

6. The electronic display device as claimed in claim 3, wherein the substrate comprises a flange adjacent to the through hole, and the flange is clamped between the extending portion and the third sheet.

7. The electronic display device as claimed in claim 3, further comprising a light source member, wherein the main portion of the bracket extends from the second side wall to the first side wall, and the light source member is arranged adjacent to the second side wall and disposed on the bracket for dissipating heat from the light source member.

8. The electronic display device as claimed in claim 3, further comprising:
 two heat dissipation plates respectively connected to two sides of the bracket; and
 two light source members respectively disposed on the two dissipation plates for dissipating heat from the two light source members via the bracket.

9. The electronic display device as claimed in claim 3, wherein each of the first sheet, the second sheet, and the third sheet has a flat configuration.

* * * * *